March 3, 1959   J. D. PETERSON   2,875,575
CONTROL SYSTEMS AND APPARATUS FOR THE POWER UNITS OF AIRCRAFT
Filed April 23, 1953   8 Sheets-Sheet 3
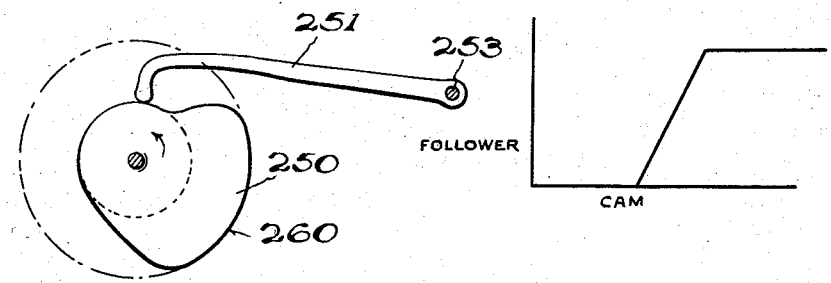
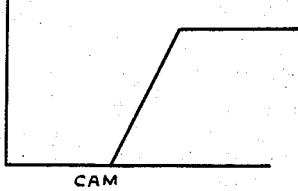
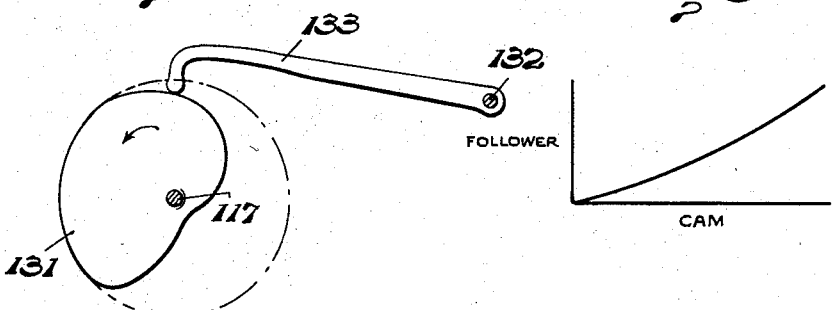
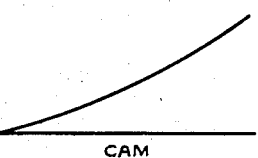
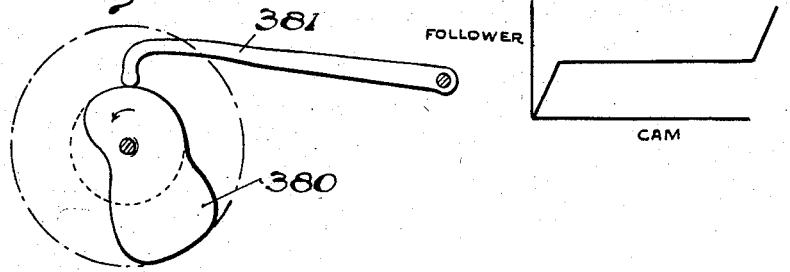
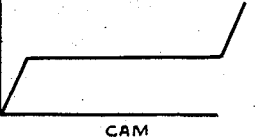
INVENTOR.
Joel D. Peterson.
BY
Herbert L. Davis
ATTORNEY

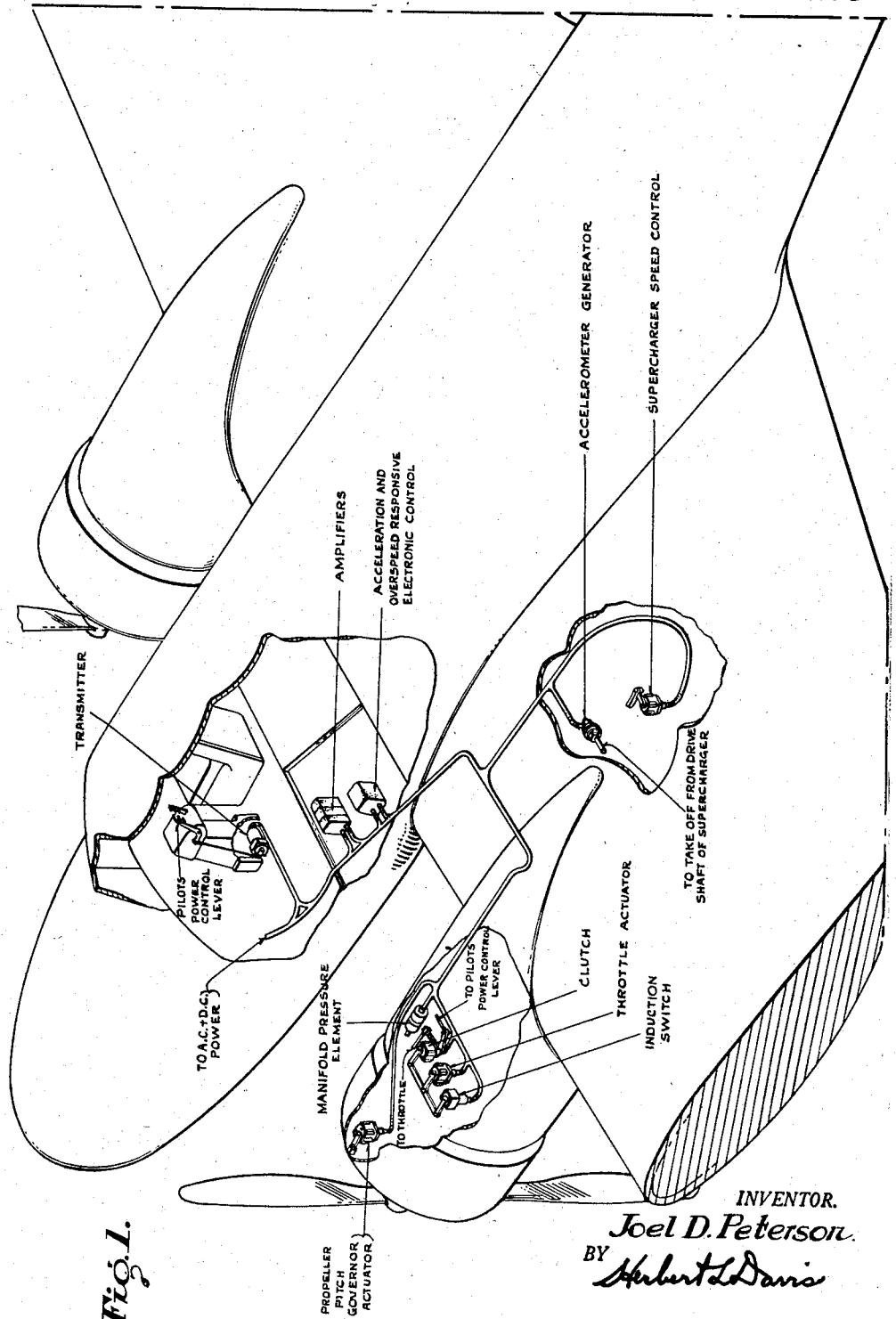

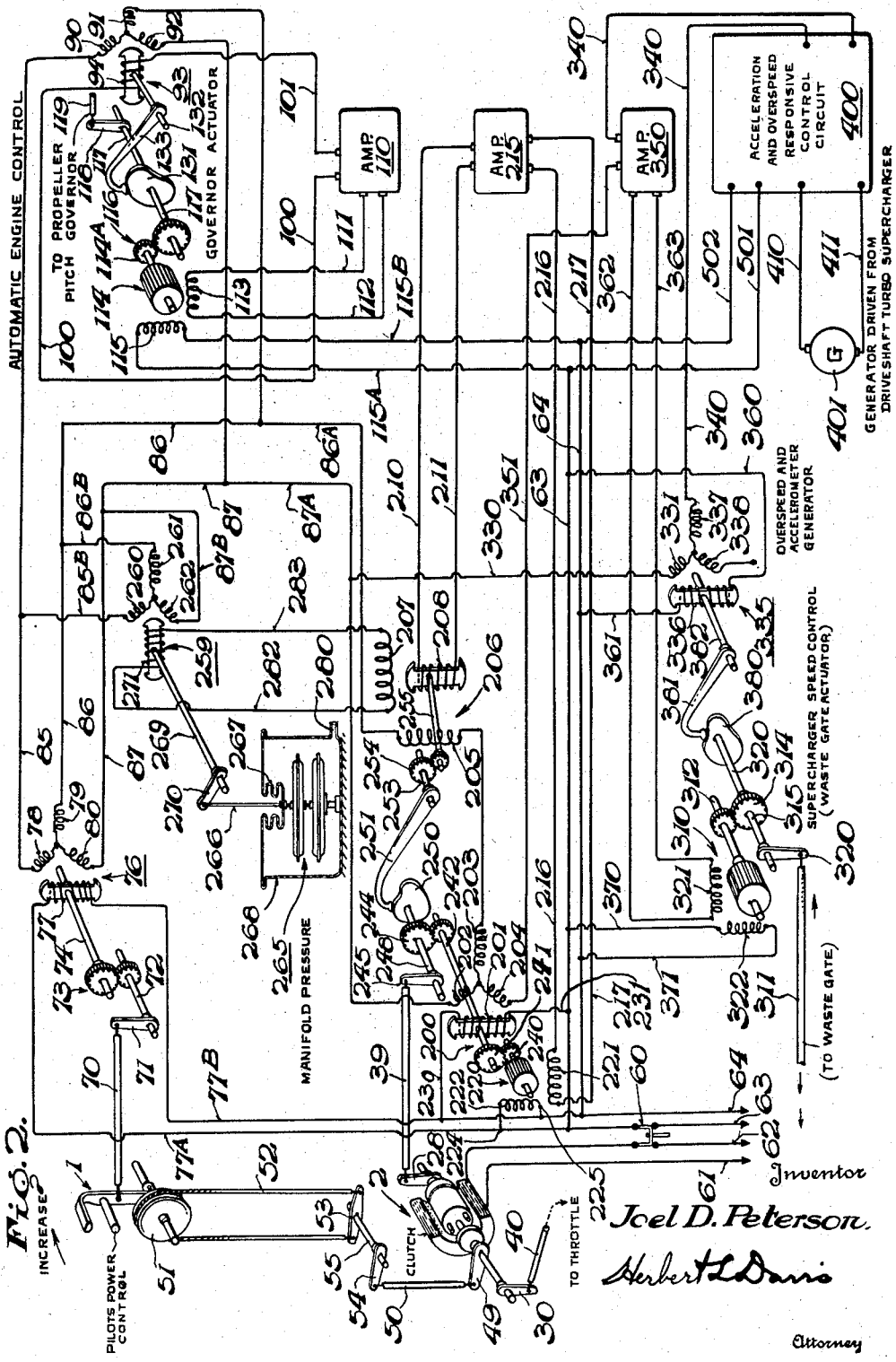

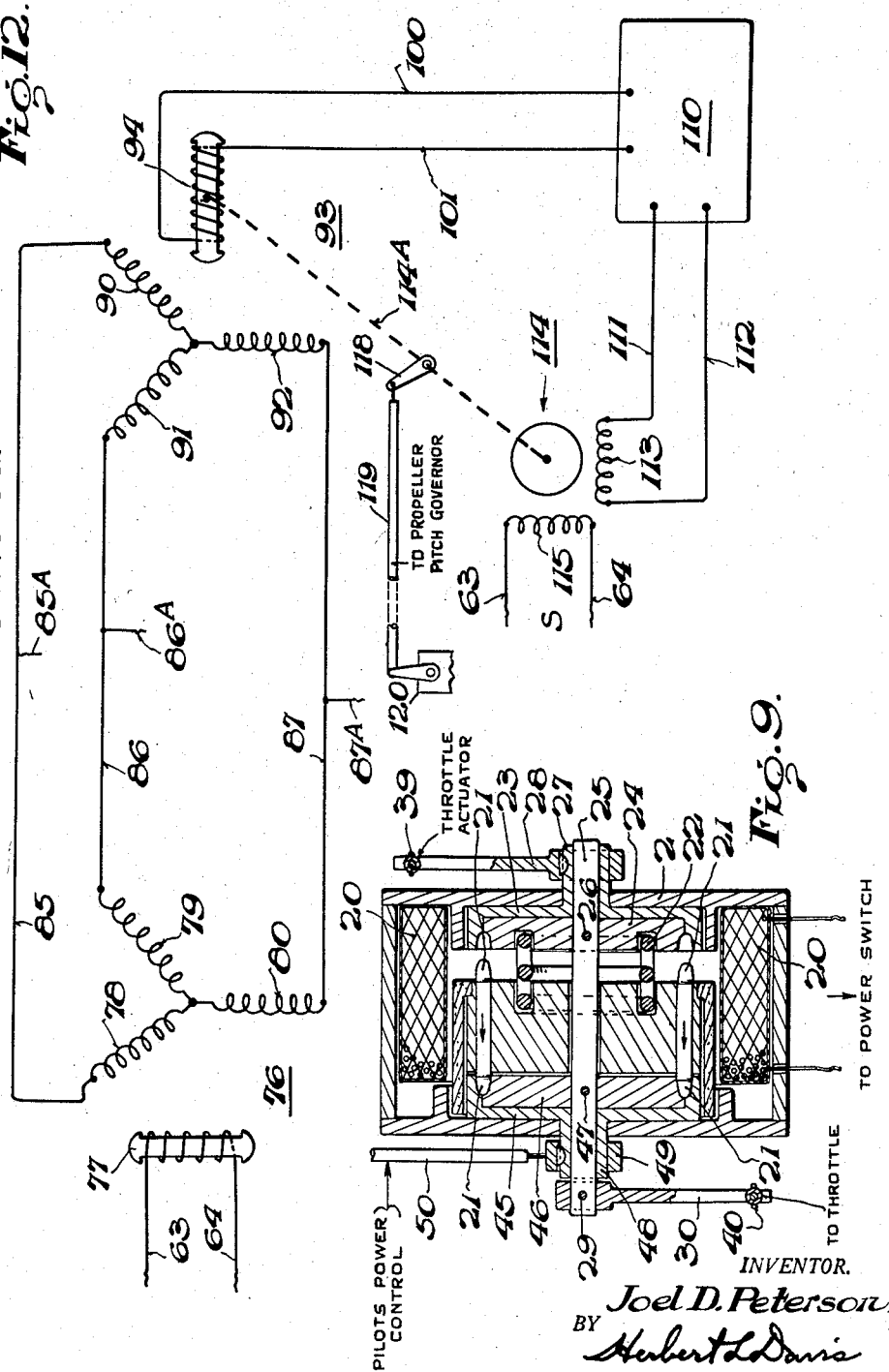

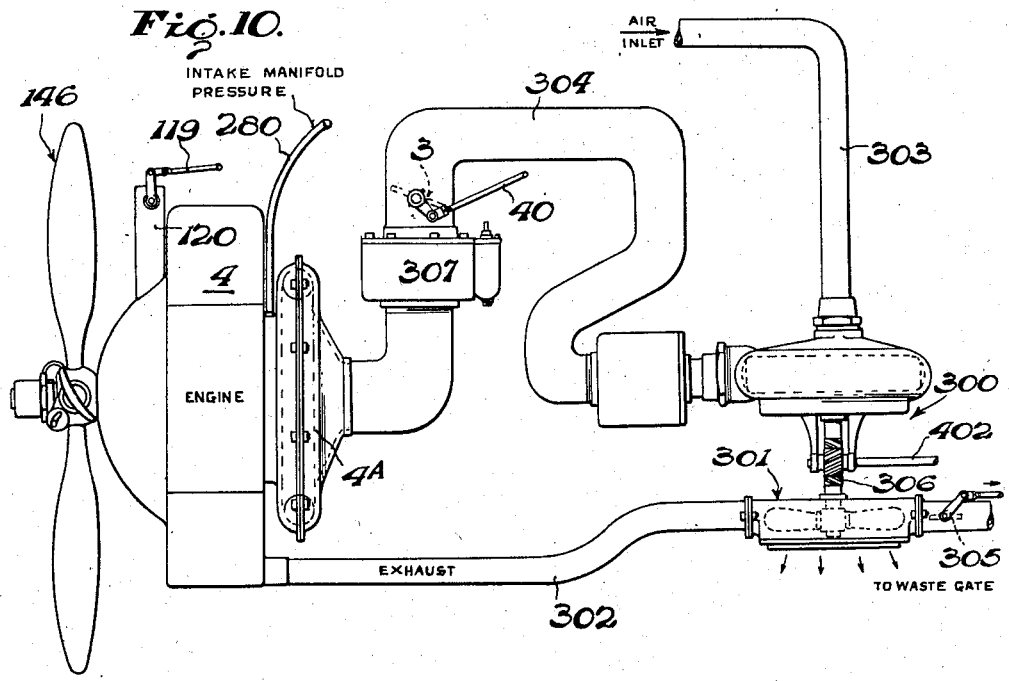
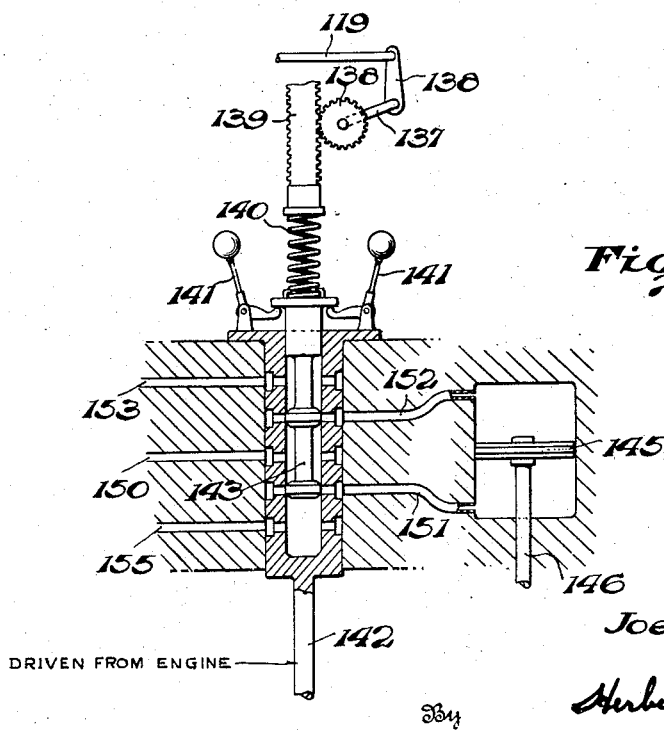

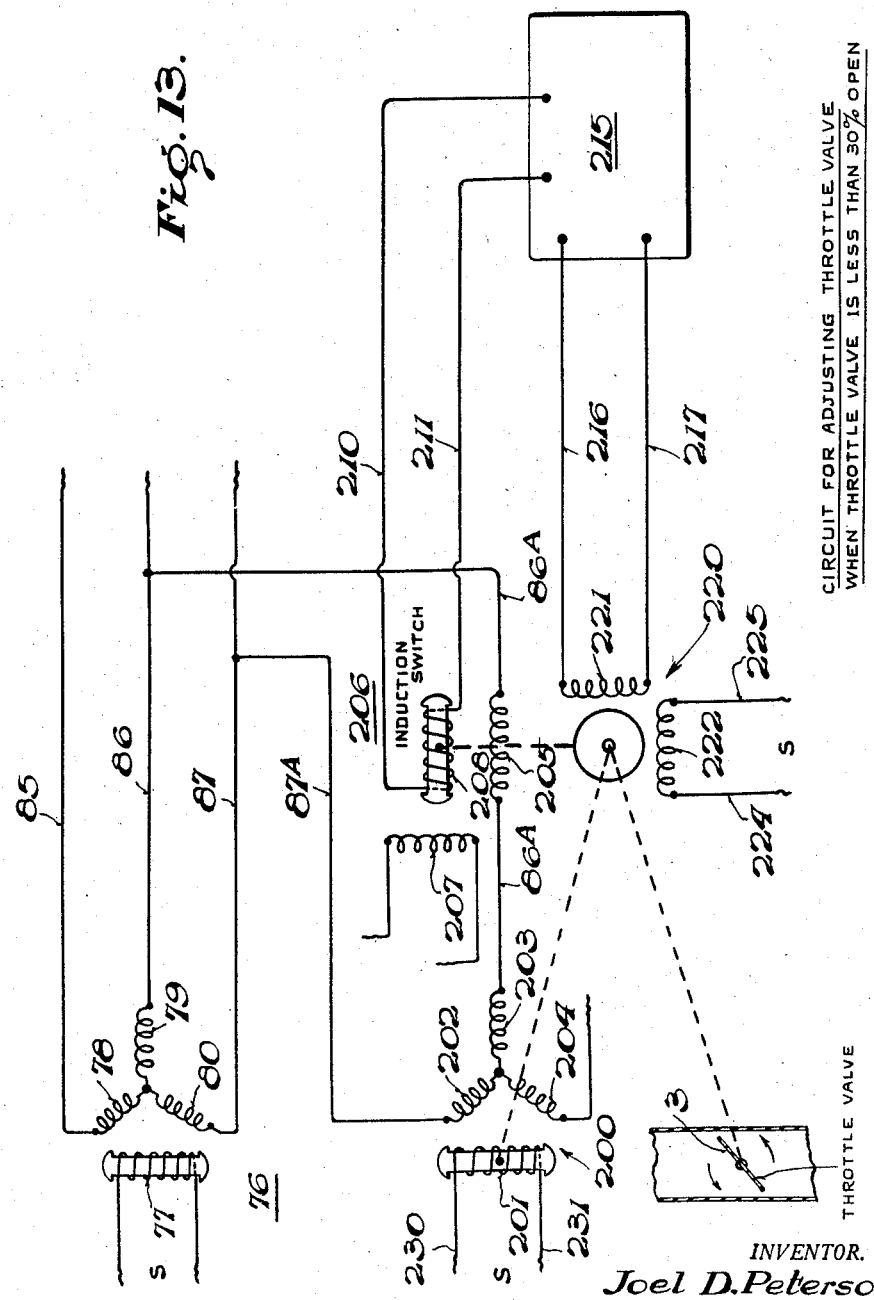

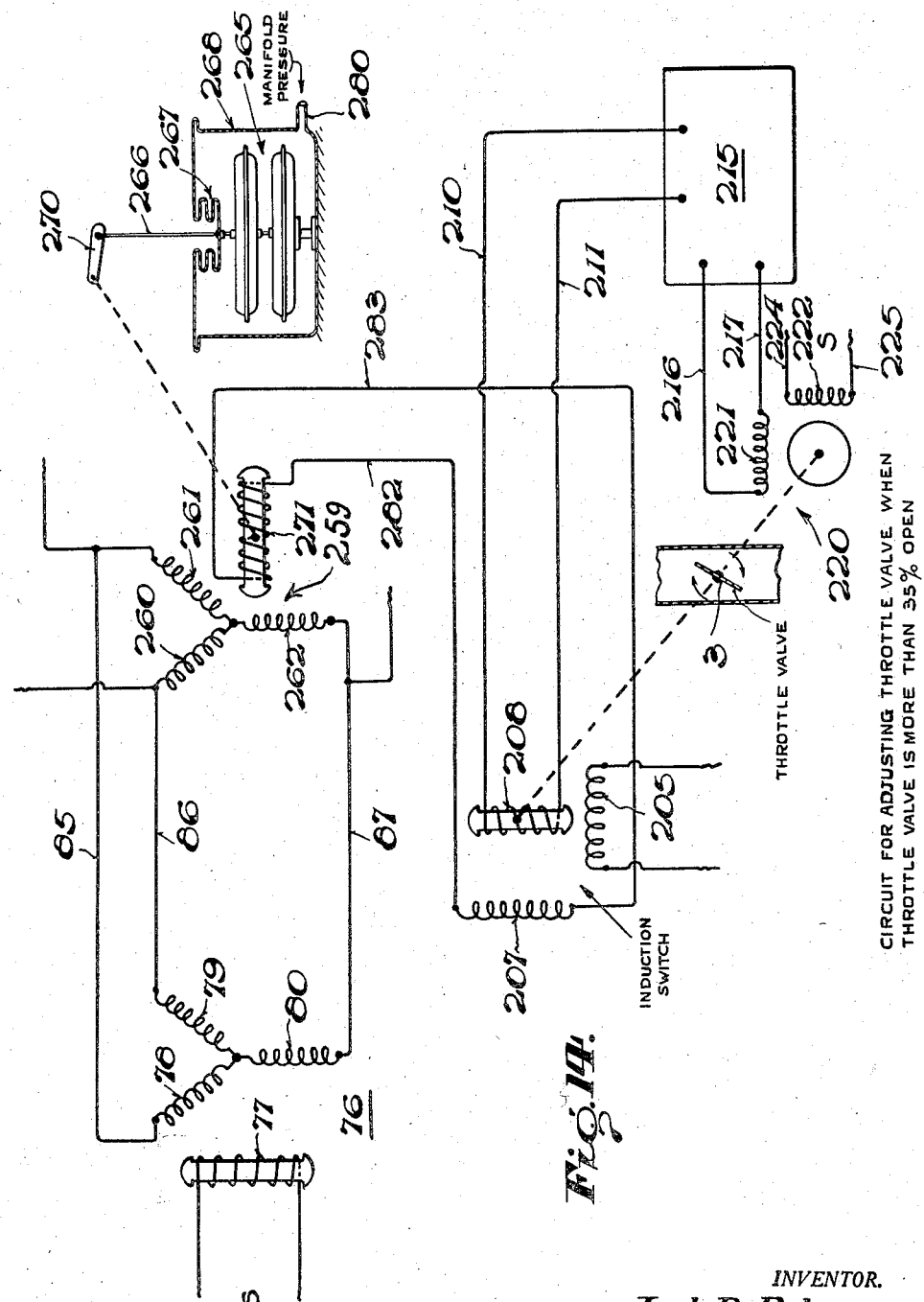

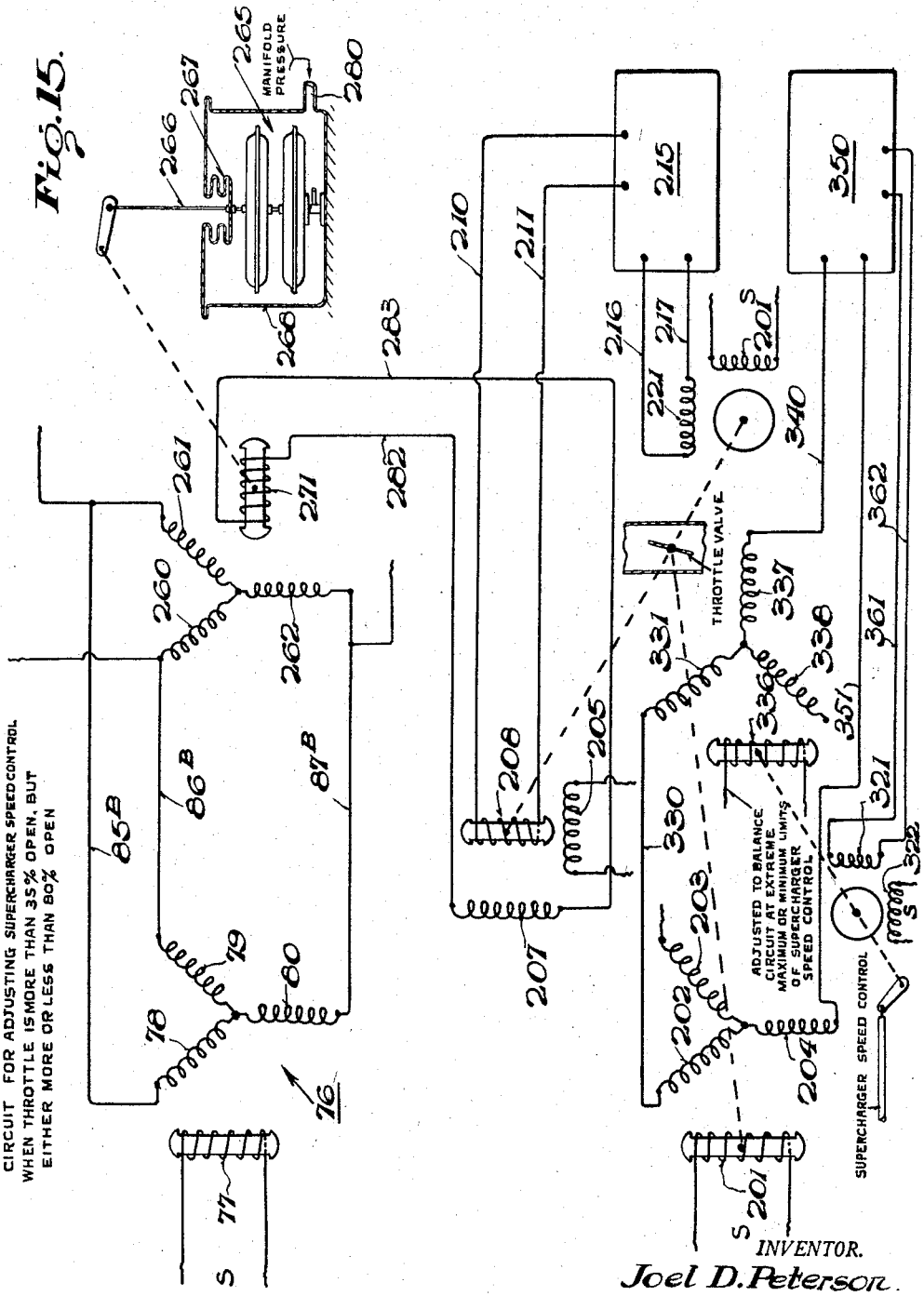

United States Patent Office 2,875,575
Patented Mar. 3, 1959

2,875,575

CONTROL SYSTEMS AND APPARATUS FOR THE POWER UNITS OF AIRCRAFT

Joel D. Peterson, Rivervale, N. J., assignor to Bendix Aviation Corporation, Teterboro, N. J., a corporation of Delaware Original application October 30, 1944, Serial No. 561,083, now Patent No. 2,824,422, dated February 25, 1958. Divided and this application April 23, 1953, Serial No. 350,723

5 Claims. (Cl. 60—13)

The present application is a division of U. S. application Serial No. 561,083 filed October 30, 1944 by Joel D. Peterson, now U. S. Patent No. 2,824,422, granted February 25, 1958 and assigned to Bendix Aviation Corporation. The invention relates to control systems and apparatus for the power units of aircraft, particularly of the supercharged internal combustion engine type arranged for driving an automatically controlled variable pitch propeller.

With present aircraft supercharged engines the best performance is maintained only by adjustment of the various functions of the engine to values consistent with efficient and safe operation of the engine, with proper compensation for external factors such as the atmospheric pressure surrounding the aircraft, which pressure is directly affected by changes in the altitude of the aircraft. The functions of the power unit controlled are engine manifold pressure and engine speed. The manifold pressure is regulated through control of an induction throttle valve and the driven speed of the supercharger, while the engine speed is regulated usually by varying the pitch of the aircraft propeller through a propeller pitch governor control.

Heretofore in order to control the throttle valve, the supercharger and the means for governing the pitch of the propeller, there have been provided separate actuators and such actuators have included a plurality of separate operating levers for each actuator and have included a labyrinth of linkage subject to wear and requiring constant care and adjustment.

Accordingly, an object of the present invention is to provide a single lever for controlling all of the several actuators for each aircraft engine and also to reduce the operating linkage of each of the several control actuators to minimum.

Another object is to provide a novel electrical system of engine control.

Another object is to provide a novel remote engine control system, whereby no mechanical control connections between the pilot's position and the engine nacelle are required.

Another object is to provide in a control system, a master transmitter controlled by a single lever in which the angular position thereof is proportional to predetermined engine speed and manifold pressure values, whereby the manifold pressure values selected by the pilot by the positioning of the transmitter will automatically be maintained within the performance range of the engine and each adjusted position of the lever will effect a corresponding definite adjustment of a propeller pitch governor so that each adjusted angular position of the pilot's control lever will effect a definite power output from the engine by selection of the manifold pressure and adjustment of the propeller pitch engine speed governor.

The above and other objects and advantages of the present invention will appear more fully hereinafter from a consideration of the detailed description which follows, taken together with the accompanying drawings wherein the features of the present invention are illustrated.

In the drawings wherein like reference characters refer to like parts through the several views:

Figure 1 is a fragmentary plan view of an aircraft with certain portions broken away so as to illustrate diagrammatically the relative positions of the several operating parts and conduits carrying the electrical connections of one form of the novel control system.

Figure 2 is a diagrammatic illustration of a form of the novel electrical control system.

Figure 3 is an enlarged side elevational view of the induction switch operating cam and follower shown in Figure 2.

Figure 4 is a diagram illustration of the movement imparted to the cam follower by the cam of Figure 3.

Figure 5 is an enlarged side elevational view of the propeller pitch governor actuator cam and follower shown in Figure 2.

Figure 6 is a diagram illustration of the movement imparted to the cam follower by the cam of Figure 5.

Figure 7 is a side elevational view of the supercharger speed control limiting cam and follower shown in Figure 2.

Figure 8 is a diagram illustration of the movement imparted to the cam follower by the cam of Figure 7.

Figure 9 is an enlarged sectional view of the clutch of Figure 2 showing the same in a de-energized position, whereby the engine induction throttle may be directly controlled by manual operation of the pilot's power control lever.

Figure 10 is a schematic view of an engine system which may be controlled by the novel control system.

Figure 11 is a schematic view of a propeller control mechanism of a type such as may be controlled by the hereinafter described system.

Figure 12 is a diagrammatic view of the portion of the electrical control circuit of Figure 2 for controlling the propeller pitch governor in response to adjustment of the pilot's control lever.

Figure 13 is a diagrammatic view of the portion of the electrical control circuit of Figure 2 for adjusting the induction throttle valve when the valve is less than thirty percent open.

Figure 14 is a diagrammatic view of the portion of the electrical control circuit of Figure 2 for adjusting the induction throttle valve when the valve is more than thirty-five percent open.

Figure 15 is a diagrammatic view of the portion of the electrical control circuit of Figure 2 for adjusting the supercharger speed control when the induction throttle valve is more than thirty-five percent open, but either more or less than the predetermined null position of approximately eighty percent open.

Referring in detail to the electric control system of Figures 2 and 10, there is provided a single control lever 1 and a compound clutch 2, whereby an induction throttle valve 3 of an aircraft engine 4 may be selectively connected either to an automatic control system herein provided or directly to the control lever 1 for manual operation.

The clutch 2 may be of any suitable type, but as shown in detail in Figure 9, includes an electromagnet 20 which when energized biases clutch pins 21 against biasing force of a spring 22 into engaging relation with a clutch plate 23 and 24. The clutch plate 24 is fastened to a shaft 25 by a pin 26, while clutch plate 23 is normally rotatably mounted on the shaft 25 and has a sleeve 27 to which there is splined an arm 28 as shown in Figure 2.

Thus upon the electromagnet 20 being energized the clutch plates 23 and 24 are drivingly connected and thus operatively connecting the arms 28 and 30.

The arm 28, as shown in Figure 2, is operably connected through a rod 39 to the automatic control mechanism, while the arm 30 is connected through a rod 40 to the throttle control valve 3. Thus upon energization of the electromagnet 20, the throttle control valve 3 is operably connected to the control system through the arms 28 and 30.

When the electromagnet 20 is de-energized the spring 22 biases the clutch pins 21 out of engaging relation with clutch plates 23 and 24 and into engaging relation with a second set of clutch plates 45 and 46 so as to disconnect the arm 28 from driving relation with the arm 30. The plate 46 is connected to the shaft 25 through a pin 47, while the plate 45 is normally rotatably mounted on the shaft 25 and has a sleeve 48 to which there is splined an arm 49 so that the arm 49 is connected by a rod 50 to the pilot's throttle control lever 1 through pulley 51, cable 52, lever 53, shaft 55 and arm 54.

Thus upon de-energization of the electromagnet 20 the clutch plates 45 and 46 are drivingly connected through operation of the spring 22, whereupon the arms 49 and 30 are operably connected. As previously explained, the arm 30 is connected through rod 40 to the induction throttle valve 3, as shown in Figure 10.

Thus when the clutch 2 is de-energized the automatic electrical control system is inoperative and the induction throttle valve 3 may be manually adjusted through operation of the pilot's control lever 1. A double pole switch 60 is provided to energize or de-energize the automatic control system simultaneously with the electromagnet 20 through electrical conductors 61, 62, 63 and 64 so that the induction throttle valve 3 may be automatically or manually controlled as desired. Moreover, it will be readily seen that as a safety provision upon a power failure the system will be automatically transferred by the de-energization of the electromagnet 20 of the clutch 2 to manual operation.

The pilot's throttle control lever 1 is further suitably connected so as to effect selective electrical control of the automatic electrical control system. Thus the lever 1 is connected by an actuator rod 70 to an arm 71, which is operably connected through a shaft 72, a gear train 73, and shaft 74 to rotor 77 of an electrical induction type transmitter or transformer 76. The gear train 73 is provided of suitable ratio, such as for example, two to one.

The transmitter 76 as illustrated hereinafter, comprises the rotor winding 77 which may be angularly displaced in relation to stator windings 78, 79 and 80 by the control lever 1, and the rotor winding 77 is arranged in inductive relation with the stator windings. Voltage is applied to the rotor winding 77 through electrical conductors 77A and 77B connected to conductors 63 and 64 leading from a suitable source of alternating current. Angular displacement of the transmitter rotor winding 77 causes the voltage applied to the rotor winding 77 to induce varying voltages in the stator windings 78, 79 and 80 of the transmitter 76 depending upon the relative position of the rotor winding 77. The voltages thus induced in the stator windings of the transmitter are applied through conductors 85, 86 and 87 to the stator windings 90, 91 and 92 of the propeller pitch governor actuator follow-up transformer or receiver 93. The latter system is shown in combination with the other features of the control system in Figure 2 and separately in Figure 12.

*Propeller pitch governor control*

Rotatably mounted within the stator windings 90, 91 and 92 and in inductive relation therewith, is a rotor winding 94. If the winding 94 is not in a position in relation to the stator windings 90, 91 and 92 corresponding to a position at right angles to the induced field or the relative position of the rotor winding 77 to the stator windings 78, 79 and 80 there will be induced into the rotor winding 94 a voltage. The rotor winding 94 is connected through electrical conductors 100 and 101 to the input of an amplifier 110. The voltage induced into the winding 94 will cause an alternating current to flow to the amplifier 110, which is in phase or in phase opposition with the alternating current flow supplied through the conductors 63 and 64, depending upon the direction of the difference in the position of the rotors 77 and 94.

The amplifier 110 may be of any suitable type of torque amplifier well known in the art, or may be an amplifier of a type such as shown, for example, in the expired Patent No. 1,586,233, dated May 15, 1926 and granted to H. Anschutz-Kaempfe. Electrical conductors 111 and 112 lead from the output of the amplifier 110 to a secondary or auxiliary winding 113 of a two-phase motor 114. A main winding 115 is connected through electrical conductors 115A and 115B which are connected to conductors 63 and 64 leading to the same alternating current source as the transmitter motor winding 77.

Thus if the rotor windings 77 and 94 are set in such a manner in relation to the stator windings that no voltage is induced into the winding 94 no current will flow in the auxiliary motor winding 113 of the two-phase motor 114 for there would be no alternating current flowing in the input circuit 100 and 101 of the amplifying unit 110. The motor 114 will therefore not operate for there is no rotating field.

When the rotor windings 77 and 94 are positioned at different angular relations to the stator windings from the null position, a voltage will be impressed on the winding 94, that is to say on the input circuit 100 and 101 of the amplifier 110, and the said voltage will be in phase or in phase opposition with the voltage supplied through the conductors 63 and 64.

The amplified current which flows in the auxiliary winding 113, will thus produce a corresponding field. Provision is further made in the amplifier 110, in a manner for example such as shown in the patent previously noted to H. Anschutz-Kaempfe, whereby the said auxiliary current or auxiliary field will have a phase displacement or difference of 90 degrees relative to the main current or main field, so that said fields form together a rotating field of sufficient magnitude to start the motor 114. It will depend on the phase direction of the alternating current voltage at the input of the amplifier 110 whether the auxiliary field will be displaced 90 degrees relative to the main field in the forward or backward direction or in other words, the direction or rotation of the rotating field will depend upon the direction of angular variation of the rotor winding 77 and 94.

The motor 114 is so arranged that if the receiver rotor 94 is not in a position corresponding to the null position for that of the transmitter rotor 77 an electrical signal is applied to the amplifier 110 which will feed power to the motor 114 to cause rotation of the receiver rotor 94 through a shaft 114A and interconnecting mechanical means, as will be explained, so as to bring the receiver rotor 94 to a position corresponding to the null position for the position of the transmitter rotor 77, whereupon the signal of the input circuit of the amplifier 110 will cease and rotation of the motor 114 terminate.

The rotor of the motor 114 is connected by the shaft 114A through a suitable gear train 116 and shaft 117 to an arm 118 to which is connected a rod 119 leading to a suitable propeller pitch governor control indicated generally by the numeral 120 and shown schematically in Figure 11.

The rotor winding 94 follows up or measures for each corresponding change of position of the transmitter, the setting of the propeller pitch governor 120. The governor 120 is actuated by the follow-up motor 114, and its ratio of movement is controlled by reduction gear train 116 and a cam 131, see Figures 2, 5 and 6 to thereby position the followup rotor winding 94 of the receiver 93 shown in Figure 2, so as to maintain proper relationship between the engine speed and manifold pressure, as will be explained. To provide for this ratio of performance there is provided a rotor shaft 132 on which is mounted a follower 133 which may be biased under suitable spring means not shown, into contacting relation with the cam surface of cam 131. The follower 133 is arranged to position the receiver rotor winding 94 through the motor 114 and cam 131 according to the movement of the pilot's control lever 1, until the position of the rotor 94 agrees with that of the transmitter rotor 77. Referring to Figures 5 and 6, the cam 131 is so shaped as to provide surfaces for contact with the follower 133 from its axis of rotation.

Thus cam 131 provides a non-lineal continuous smooth curve of actuation for the governor 120, as shown in Figure 6, which co-acts with the selected position of the transmitter 76 to maintain proper speed relationships of the engine to those selected by the pilot.

Thus, as in the other follow-up motor arrangements of the several actuators hereinafter to be described, the rotor two-phase motor 114 in the governor actuator is energized and angularly positioned accordingly to a selected position of the master transmitter 76 to thereby actuate rod 119 through lever 118 mounted on cam shaft 117, until rotor 94 of the governor follow-up transformer 93 is angularly shifted to a null position for no voltage output to amplifier 110.

The rod 119 is connected to a propeller pitch governor control 120 which may be of any suitable type well known in the art. The same is shown in Figure 11 as being of a type having a lever and a suitable shaft 137, gear 138 and rack 139 for adjusting the governor spring 140 and fly-weight governor 141. The fly-weight governor 141 is mounted at one end of a shaft 142 drivingly connected through suitable gear means, not shown, to a drive shaft of the aircraft engine 4, which engine is controlled through the system hereinafter described.

Slidably mounted in the shaft 142 is a valve 143 adjustably positioned under tension of the spring 140 and the counter-acting biasing force of the centrifugally actuated fly-weights 141. The valve 143 controls the operation of the piston 145, which controls the pitch of a propeller 146 driven by the engine 4. Thus the engine speed may be controlled by varying through the operating rod 119 the tension of governor spring 140 and the resultant position of the pilot valve 143 and piston 145.

The piston 145 operates a rod 146 arranged in any suitable manner well known in the art to control the pitch of the aircraft propeller.

The rod 146 may have a rack, not shown, at its extremity in connection with a gear train, not shown, for varying the pitch of the propeller 146 in a conventional manner. The propeller pitch control is so arranged that by increasing the tension exerted by the spring 140 the valve 143 will be adjusted from a neutral position so as to connect fluid inlet port 150 to port 151 leading to one side of piston 145 and opening port 152 leading from the opposite side of the piston 145 to fluid outlet port 153. Movement of the piston 145 will then be effected to decrease the pitch of the propeller 146 and thereby increase the driven speed of the propeller until the centrifugal forces acting upon the fly-weights 141 is sufficient to return the valve 143 to a neutral position.

Conversely by decreasing the tension exerted by the spring 140 on the valve 143, the centrifugal forces acting upon the fly-weights 141 will cause the valve 143 to be adjusted in an opposite direction from the neutral position so as to open the port 152 to the fluid inlet port 150 and the port 151 to the outlet port 155, thus effecting movement of the piston in an opposite direction and causing an increase in the adjustment of the pitch of the propeller so as to decrease the driven speed of the propeller until the centrifugal force acting upon the fly-weights 141 is decreased sufficiently so that the tension of the spring 140 will return the valve 143 to a neutral position.

Thus by increasing the tension of the spring 140 the speed of the engine increases, while upon a decrease in the tension of the spring 140 the speed of the engine decreases.

In the operation of the automatic means it will be readily seen that as the control lever 1 is moved in a clockwise direction for increasing the speed of the engine rotor 77 will be moved in a counter-clockwise direction causing motor 114 to effect movement of rotor 94 in a corresponding direction through rotation of cam 131 in a counter-clockwise direction effecting movement of follower arm 133 under spring tension in a similar direction until the null position is reached for the rotor 94, whereupon operation of the motor 114 is terminated.

Such operation of the motor 114 also effects through shaft 117 a counter-clockwise movement of the arm 118 effecting through the rod 119 a counter-clockwise movement of the arm 139 and thus effecting an increase in the biasing force exerted by the spring 140 and causing as previously explained a decrease in the pitch of the propeller, whereupon the speed of the engine 4 may be increased. An opposite effect will of course be produced upon moving lever 1 in a counterclockwise direction.

*Throttle actuator*

In addition to operating the propeller pitch governor control the positioning of the rotor 77 also controls the position of the induction throttle valve 3 which regulates the induction pressure of the engine 4 as will be explained.

As shown in Figures 2 and 13 there is provided a second receiver 200 which has a rotor winding 201 and stator windings 202, 203 and 204. The stator winding 202 is connected through electrical conductors 87A and 87 to the stator winding 80 of the transmitter 76, while the stator winding 203 is connected through electrical conductors 86A and 86 to the stator winding 79 of the transmitter 76. A high impedance inductive winding 205 is provided in the conductor 86A and the winding 205 forms one stator winding of an induction switch 206.

The induction switch 206 has a second inductive stator winding 207 which is preferably positioned at right angles to the inductive winding 205 so that when a rotor winding 208 of the induction switch 206 is positioned at right angles to the winding 207, as shown in Figure 2, the winding 208 will be inductively coupled with the winding 205 and there will be no inductive coupling between the winding 208 and winding 207. However, when the rotor winding 208 is positioned at right angles to the winding 205 the winding 208 will be inductively coupled to the winding 207 and there will be no inductive coupling between the winding 208 and the winding 205.

The rotor winding 208 is connected by electrical conductors 210 and 211 to the input of an amplifier 215 of similar type to the amplifier 110 previously described. The amplifier 215 has output conductors 216 and 217 in which is inserted one of the two windings of two-phase motor 220 and which winding will be hereinafter described as secondary winding 221. The main winding 222 is connected through electrical conductors 224 and 225 to the alternating current conducted through conductors 63 and 64. The rotor winding 201 of the receiver 200 is connected through electrical conductors 230 and 231 with said source of alternating current and is rotatably positioned in relation to said stator windings 202, 203 and 204 by said motor 220, as will be explained.

As best shown in Figure 13, the stator windings 79 and 80 of the transmitter 76 together with the electrical conductors 86, 87, 86A, 87A, stator winding 205 of induction switch 206 and stator windings 202 and 203 of the receiver 200 provide a closed circuit.

There is induced in this closed circuit through the alternating current flowing in the rotor winding 77 a first voltage and through the alternating current flowing in the winding 201 a second voltage which tends to oppose the first voltage. If the rotor winding 77 be positioned at a different angular relation to the stator windings 79 and 80 than the rotor winding 201 is positioned in relation to the stator windings 202 and 203, it will be readily seen that a greater or less voltage will be induced in the closed circuit by the one than by the other. The difference between these induced voltages will effect a current flow through the high impedance windings 205.

Thus in the event the rotor inductive winding 208 of the switch 205 is positioned in inductive relation to the stator winding 205 as shown in Figure 13, a corresponding voltage will be induced in the winding 208, which upon amplification by the amplifier 215 will cause an alternating current flow in the auxiliary winding 221 of the two-phase motor 220; such current flow will have a phase displacement or difference of ninety degrees relative to the main winding 222, so as to effect rotation of the motor 220. The direction of rotation of the rotating field will depend upon whether the voltage induced into the closed circuit by one or the other of the rotor windings 77 or 201 be greater; the motor 220 being so arranged as to move the rotor winding 201 in a direction relative to the stator windings 202 and 203 so as to cause the voltages induced into the said circuit to equalize, whereupon no current will flow in the winding 205 and rotation of the motor 220 will terminate. The motor 220 drives the rotor winding 201 through a suitable driving means including shaft 240 and reduction gearing 241. The motor 220 also drives through shaft 242, gear train 244, shaft 248 and arm 245, which is connected through rod 39 to the arm 28 of the electromagnetically operated clutch 2. The motor 220 upon energization of electromagnet 20 of clutch 2 controls the position of the induction throttle valve 3. The motor 220 also drives through shaft 248, a cam 250.

An arm 251 rides in contacting relation along the cam surface of the cam 250 under suitable biasing means, such as a spring tension means, not shown. The arm 251 is drivingly connected through a shaft 253, suitable gear train 254, and shaft 255 to the rotor 208 of the induction switch 206 so that upon rotation of cam 250 to a position where the arm 251 rides on raised portions 260 of the cam 250, the rotor 208 will be shifted to a position at right angles to the winding 205 and in inductive relation to winding 207.

It will be readily seen, that with the rotor 208 of the induction switch 206 positioned in relation to the winding 205, as shown in Figure 13, the motor 220 effects a motion follow-up of the position of the transmitter rotor 77. Thus movement of the rotor 77, in a counter-clockwise direction, will effect a corresponding follow-up clockwise movement of the winding 201 and counter-clockwise movement of the cam 250 until a shifting of the induction switch rotor winding 208 in response to movement of the control lever 1 is effected so as to place the winding 208 in non-inductive relation with the winding 205 and in inductive relation with the winding 207. Such counter-clockwise movement of the cam 250 will of course effect a corresponding counter-clockwise movement of the arm 245 affixed to the shaft 248 so as to progressively open the throttle valve 3, through rod 39, arm 28, clutch 2, arm 30 and rod 40.

The cam 250 is so arranged that the direct motion follow-up of the rotor 77 is effected for a predetermined range of movement of the throttle valve 3, such as for example from full closed position to thirty percent open throttle position. At the latter predetermined position, the cam 250 will begin shifting the induction switch rotor winding 208 to a position out of inductive relation with winding 205 and into inductive relation with winding 207. The action may take place for a predetermined range of movement of the throttle valve 3, for example from thirty percent to thirty-five percent open position of the throttle valve 3.

*Manifold pressure control*

Upon the rotor winding 208 being shifted to a position in inductive relation with the winding 207 the control of the throttle 3 shifts from a motion follow-up to a manifold pressure follow-up.

The manifold pressure control as best shown in Figure 14 includes a receiver transformer 259 having the stator windings 260, 261 and 262 which are connected in parallel with the transmitter stator windings 78, 79 and 80 and the receiver transformer 93, stator windings 90, 91 and 92 through electrical conductors 85B, 86B and 87B connected respectively to the conductors 85, 86 and 87.

The manifold pressure follow-up arrangement for maintaining the engine manifold pressure in accordance with the pilot's selected pressure comprises a two-celled evacuated bellows 265, a take-off rod 266, and a bellows seal 267 for sealing the shaft opening in the casing 268. The rod 266 is connected by arm 270 and shaft 269 to a single phase rotor 271 of the receiver transformer 259. The casing 268 is sealed and connects to the intake manifold of engine 4 by conduit 280, as shown in Figures 2 and 10.

Thus when the evacuated diaphragm 265 collapses, as the pressure at the intake manifold increases a resulting pull is exerted on rod 266, thereby moving rotor winding 271. Now, if the pressure selected by control lever 1 connected to transmitter 76 is different from the then existing engine manifold pressure, there is a voltage induced in the rotor 271 due to its angular relationship to the resultant field produced in the stator windings 260, 261, and 262. Accordingly, if the position of the rotor 271 which is determined by the engine manifold pressure in relation to the stator windings 260, 261 and 262 corresponds to the null position, there will be no voltage induced in the rotor 271. However, if the rotor winding 271 is not at a null position relative to the position of the rotor winding 77 a voltage will be induced in the wing 271, the phase of which is determined by the direction of the difference in the relative positions of the rotor winding 77 and 271. The voltage so induced in the rotor 271 is applied through conductor 282 and 283 to the stator winding 207, this induces a corresponding voltage in the rotor winding 208 of the inductive switch 206 causing a flow of alternating current through conductors 210 and 211 to the input of the amplifier 215.

As previously explained, output conductors 216 and 217 lead from the amplifier 215 to the secondary winding 221 of motor 220. The main winding of the motor 220 is connected to the constant source of alternating current by conductors 224 and 225, the phasing between these voltages is such that the motor angularly positions the throttle 3 in such a direction that the resulting increase or decrease in the manifold pressure turns the rotor winding 271 toward the null position to agree with the pressure change.

Thus it will be seen that the throttle 3 is adjusted by the motor 220 so as to maintain a pressure in the intake manifold as selected through manual operation of the control lever 1. Moreover such selected pressure is increased by movement of the control lever 1 in a clockwise direction and transmitter rotor 77 in a counter-clockwise direction, requiring a corresponding counter-clockwise movement of the rotor 271 to balance the transmitter rotor 77.

After the throttle 3 has been initially opened to a position in excess of a predetermined degree of say eighty percent, then a further call for an increase in the intake manifold pressure through operation of rotor winding 271 will cause operation of a supercharger 300 as will be explained.

Operation of the supercharger 300 will cause the intake manifold pressure to be increased and as a result the pressure member 265 will again apply voltage to the throttle actuator motor 220 to return the throttle valve 3 to the eighty percent reference position.

*Supercharger control*

In the event the throttle valve 3 has been opened to the predetermined degree of eighty percent upon a further call for increase in the intake manifold pressure the further opening of the throttle valve 3 will effect operation of the auxiliary supercharger indicated in Figure 10 by the numeral 300.

The auxiliary supercharger 300 may be driven by suitable driving means shown diagrammatically in Figure 10, such as a turbine indicated by the numeral 301 and driven by the exhaust gas from engine 4 through exhaust conduit 302. The auxiliary supercharger 300 has an air inlet conduit 303 which may be connected to an air scoop in a conventional manner.

There is further provided an air conduit 304 leading from the outlet of the auxiliary supercharger 300 to the inlet of a main supercharger 4A driven by the crank shaft of the engine 4. A carburetor 307 having a throttle 3 is provided in the air conduit 304 in the conventional manner. The speed of rotation of the supercharger 300 and the turbine 301 is controlled by a waste gate 305 in a manner well known in the art. Any other suitable driving means for the supercharger 300 may be provided instead of the turbine 301 such as an auxiliary variable speed motor means of any suitable type. In the instant case the waste gate 305 is controlled by a motor 310 through a rod 311. The motor 310 being connected to the rod 311 by a shaft 312, train of gears 314, and shaft 315 connected to an arm 320 to which the rod 311 is operably connected. Motor 310 is of a reversible two-phase type, such as previously described having a secondary winding 321 and a primary winding 322. Operation of the motor 310 is controlled by the transformer 200 having rotor winding 201 and stator windings 202, 203 and 204, as previously explained.

A conductor 330 leads from the stator winding 202 through conductor 87A to a stator winding 331 of transformer 335. The transformer 335 has stator windings 331, 337 and 338, the stator winding 331 is connected to the stator winding 337 by a Y connection and through winding 337 and electrical conductor 340 to an acceleration over-speed responsive device 400, as will be explained hereinafter, and through the device 400 to the input of an amplifier 350 of similar type to amplifiers 110 and 215.

Conductor 351 leads from the stator winding 204 of the transformer 200 to the input of the amplifier 350. A rotor winding 336 of the transformer 335 is connected by conductors 360 and 361 to the conductors 63 and 64 leading from the main source of alternating current.

The rotor 201 is so arranged in relation to the stator windings 202 and 204 of the transformer 200 that upon the throttle being positioned by the motor 220 to a position less than a predetermined null position of, for example, eighty percent open, a combined voltage will be induced into the windings 202 and 204 which will be opposed to the combined voltage induced into the windings 331 and 337 by the alternating current in the transformer 335. The difference between such combined voltages will cause a flow of current to the input of the amplifier 350 and through output conductors 362 and 363 to the secondary winding 321. The said current in the winding 321 having such a phase relationship with the alternating current flowing in the main winding 322 as to tend to rotate the motor 310 in a direction opening the waste gate 305.

In the initial adjustment of the valve 3 from a closed position, the waste gate 305 will be held in an open position by this action of the motor 310 until the null point of the throttle valve of say eighty percent open has been passed.

When the throttle 3 has been adjusted to a position in excess of the null point, the combined voltage induced in the windings 331 and 337 and that induced in the windings 202 and 204 by the alternating current in the winding 201 will have an opposite difference. Such predominating voltage will cause a flow of current to the input of the amplifier and to the secondary winding 321 opposite to that previously described and the current flowing in the secondary winding 321 will be of a phase sufficient to initiate operation of the motor 310 in a direction for closing the waste gate 305.

There is also affixed to the shaft 320 a cam 380 on the cam surface of which rides a cam follower arm 381 which adjusts through a shaft 382, the rotor winding 336 of the transformer 335. The cam surface of the cam 380 as shown in Figures 7 and 8 is such that the cam 380 adjusts the rotor winding 336 only within an initial closing range and an extreme closing range of the waste gate 305. The winding 336 thus provides within these limited ranges a follow-up responsive to the position of the throttle 3 whereby there is induced into the stator winding 331 and 337 a voltage which will be equal to the voltage induced into the stator windings 202 and 204 by the rotor winding 201 at corresponding positions of the rotor windings.

Between these two extreme ranges, control of the speed of the supercharger will be controlled by the position of the throttle valve to one side or the other of the null point in response to the operation of the pressure responsive member 265 controlling the transformer 259. Thus between the two extreme ranges there is a range wherein control of the supercharger 300 is effected in response to the intake manifold pressure as indicated in Figure 8.

It will be readily seen that as the waste gate 305 is closed the speed of the turbine 301 will be increased and the supercharger 300 will be driven by the turbine through a driving shaft 306 at an increased speed. An increase in the driving speed of the supercharger 300 will effect an increase in the pressure supplied to the intake manifold which will, through conduit 280, cause the bellows 265 to further contract moving the rotor winding 271 into a position calling for less pressure and effecting through windings 207 and 208 of the induction switch 206, amplifier 215 and motor 220 movement of the throttle in a closing direction which will move the winding 201 toward the null position. When the throttle 3 has reached this null point the combined voltages induced into the windings 331 and 337 will neutralize stopping the further opening of the waste gate 305.

Should the pressure within the intake manifold increase for any reason the bellows 265 will contract moving the rotor winding 271 in a direction calling for less pressure, whereupon the motor 220 will actuate the throttle 3 in a closing direction and causing a difference in the combined voltages induced in the windings 202 and 204 through the winding 201, and the combined voltages induced in the winding 331 and 337 by the alternating current in the rotor winding 336.

This difference in voltage will effect the winding 321 of the motor 310 through the amplifier 350 in such a manner as to cause the motor 310 to rotate in a reverse direction tending to open the waste gate 305 whereupon the turbine 301 will be driven by the exhaust gas from the engine 4 at a slower rate effecting a decrease in the intake manifold pressure to the selected value.

From the foregoing it will be readily seen that there is provided novel means operable through power control lever 1 for first positioning the throttle valve in accordance with a selected intake manifold pressure, and further novel means for increasing this intake manifold pressure upon the throttle being positioned in excess of a null point including novel means whereby the speed of the supercharger may be regulated in accordance with the intake manifold pressure so as to maintain the pressure selected through operation of the power control lever 1. The selection of the intake manifold pressure may be varied as desired within the range of the system.

Stabilization of the waste gate actuator or supercharger speed control means motor 310 is specifically provided by a control system 400 including an alternating current generator 401 driven by a shaft 402 from the supercharger turbine shaft 306, as shown in Figure 10.

The voltage and frequency output of the generator 401 is directly proportional to the speed of the supercharger driving turbine means 301. As shown in Figure 2 the generator 401 is connected through electrical conductors 410 and 411 into the overspeed and acceleration responsive control indicated generally by numeral 400. The control 400 is arranged to apply to the lines 340 a control signal preventing overspeeding of the supercharger 300 and maintaining the rate of change in the speed of rotation of the supercharger 300 to within predetermined safe values as disclosed and claimed in the copending parent application Serial No. 561,083, filed October 30, 1944, now U. S. Patent No. 2,824,422.

*Operation*

In operation, when the pilot through lever 1 moves rotor 77 according to a selected position, there is induced a certain combination of voltages in the stator windings 78, 79 and 80. These voltages are applied to the measuring follow-up transformers, for example, the follow-up transformer 259 in the manifold pressure control thereby cause currents which produce a resultant field in its stator windings 260, 261 and 262.

If the position of rotor 271 of this follow-up transformer, determined by the manifold pressure acting on diaphragm 265, is such that the voltage induced in the follow-up rotor 271 is zero no control operation will be effected. If the rotor 271 is not in this position, as when the measured manifold pressure differs from the pilot's selection, there will be induced a voltage in the follow-up rotor winding 271 the phase of which is determined by the direction of coupling.

The voltage from single phase rotor 271 is then applied through conductors 282 and 283 to stator winding 207 of switch 206. This induces a corresponding voltage in rotor 208, which is carried by conductors 210 and 211 to the amplifier 215, the output of which amplifier feeds the secondary phase winding 221 of the two-phase throttle actuator 220. The other phase winding 222 of this motor 220 is connected to the main source of alternating current.

The phasing between these voltages in the motor windings is such that the motor 220 actuates the throttle 3 through gear trains 241 and 244, and in such a direction that the resulting change in pressure causes the diaphragm 265 to actuate transformer 271 toward the null position.

The same principle of operation applies to the governor actuator, which includes a follow-up transformer 93 positioned by a two-phase motor connected to the output of amplifier 110 which operates as a direct follow-up from the pilot's control lever 1 and the transmitter 77.

This transformer 93 is electrically connected to the pilot's transmitter 77 in a parallel with the manifold pressure transmitter 259, and if the position it measures differs from that selected, it feeds a signal to the input of amplifier 110 by conductors 100 and 101 from its single phase rotor 94. The output of amplifier 110 leads to the secondary winding 113 of the two-phase governor actuator motor 114 to adjust the pitch of the propeller 146. The pitch of the propeller 146 being decreased as the selected manifold pressure is increased by movement of the control lever 1 in a clockwise direction.

In addition to the two-phase throttle actuator motor 220 there is provided the transformer 200 with rotor 201 and stator windings 202, 203 and 204. When the transformer 200 is used as a follow-up at small throttle openings, the voltage induced across the stator windings 202 and 203 thereof is compared with that induced across the stator windings 79 and 80 of the transmitter 76. The difference between these voltages is fed to stator winding 205 of induction switch 206, which through induction to rotor 208 is fed by conductors 211 and 210 to amplifier 215, and its output is fed by conductors 216 and 217 to to the secondary winding 221 of the two-phase motor 220 to cause actuation thereof in the proper direction to position the throttle.

Whether the throttle actuator 220 is actuated as a direct follow-up from its connection with transmitter 76, or is actuated from connection with the pressure follow-up transformer 259 is determined automatically by cam 250 driven by the throttle actuator motor 220 through shaft 242, so as to control the position of the rotor 208 of inductance switch 206. The cam 250 is so shaped and so proportioned as to transfer from the direct follow-up connection with the transmitter 76 to a follow-up connection with the engine manifold pressure control follow-up transformer 259 at approximately 35 percent open throttle position.

The transmitter 76 causes a direct follow-up adjustment of the throttle 3 from zero to approximately thirty percent open position and provides manually operable means for overcoming the effects which would otherwise be produced by controlling the throttle valve 3 through the intake manifold pressure in view of the characteristic inversion of pressure at the intake manifold of an engine which occurs upon adjustment of the throttle valve 3 to somewhat less than thirty percent open. Moreover the latter manually operable means facilitates the starting of the engine.

Thus when moving the pilot's control lever 1 in the range corresponding to the zero to thirty percent throttle valve open position, proportional opening of the throttle valve 3 is accomplished and the throttle valve 3 follows the position of the control lever 1.

When the throttle valve 3 is in a position above 35 percent open, the throttle valve 3 is in pressure follow-up, that is, the same is positioned in accordance with the intake manifold pressure selected by the pilot's control lever 1.

When the throttle is between thirty percent and thirty-five percent open the signal to the amplifier 215 is a combination of position follow-up and pressure follow-up. The reason for the latter arrangement is to provide a smooth transition from the position follow-up to the pressure follow-up.

With reference to the throttle actuator motor 220 the rotor winding 201 of the rotary transformer 200 is arranged to induce a voltage in the stator windings 202 and 204 which are in turn connected to the stator windings 331 and 337 of the transformer 335. The rotor winding 336 of the transformer 335 is arranged to induce an opposing voltage in the latter stator windings 331 and 337. The difference between the said opposing voltages determines the direction of rotation of the motor 310. The said rotor windings 201 and 336 being so arranged that when the throttle valve 3 is positioned below a predetermined null point of say about eighty percent open the motor 310 will be actuated in a direction for opening the waste gate 305 so as to decrease the speed of the supercharger 300. Conversely, when the throttle valve 3 is in a position more than the said null position of about eighty percent open the motor 310 will be driven in a direction for closing the waste gate 305 so as to increase the driving speed of the auxiliary supercharger 300 and thereby the pressure within the intake manifold.

Such operation thus regulates the boost pressure from the supercharger so that selected pressure can be maintained. However, upon the rotor winding 201 being returned to the null position due to the operation of the manifold pressure responsive means 265 and 259, operation of the motor 310 will cease.

During operation it being remembered that the pressure follow-up transformer 259 is in control if the pressure selected by the pilot through movement of the transmitter 76 is such that the throttle 3 moves to more than the null position or about eighty percent of the wide open position, the throttle transformer 200 causes a signal voltage to be transmitted to the amplifier 350, which in turn operates the two-phase waste-gate motor 310, to close the gate 305 and increase the turbine speed. This will cause an increase in supercharger output, and therefore an increase in manifold pressure. This pressure operates through a manifold pressure responsive element 265 and it is connected to follow-up transformer 259 so as to cause the throttle 3 to close slightly, until about eighty percent open throttle position or the null position is reached. At this position, the transformer 200 in the throttle actuator and the transformer 335 induce neutralized signals to the follow-up motor 310 in the waste-gate 305 in the adjusted position.

Should the pilot now select a different pressure by moving the transmitter rotor 76, the measured manifold pressure and selected pressure will differ, and the throttle 3 will then be moved to produce the desired value. Since the throttle actuator transformer 200 has moved from the null position, or from about eighty percent open throttle position, it causes a signal to be transmitted to the waste gate actuator follow-up motor 310 to change its setting. Again the resulting change in manifold pressure will reset the throttle 3 to its null or about eighty percent open reference position.

If the selected pressure is such that the throttle 3 is held in a position less than the null position, the system will hold the waste gate 305 wide open. On the other hand, if a high pressure is selected, so that the turbine 301 is operating at top speed as limited by the overspeed control network 400, the throttle 3 will be opened more than the null position to produce the selected pressure, or as near this pressure as can be produced with top speed of the turbine 301 and wide open throttle 3.

If the conditions are such that the turbine 301 is operating at any speed between its minimum (as determined with the waste gate 305 wide open), and its maximum (as limited by the overspeed control of the circuit 400), the throttle 3 will always be at the null position or about eighty percent open, except during transients. The purpose of using this reference position, instead of waiting until the throttle 3 is wide open before increasing the speed of the turbine 301 is to have a means of immediately providing any required change in pressure without waiting for the turbine 301 to accelerate and also allows for the time delay required for the air to flow to the engine. Without this feature, a selection of higher pressure for more power without moving the throttle 3 would require closing of the waste gate 305 and momentary loss of engine power due to higher exhaust pressure.

The novel method of regulating the air intake manifold pressure of an aircraft engine, as herein disclosed, is claimed in a divisional U. S. application Serial No. 350,724 filed April 23, 1953 by Joel D. Peterson, now U. S. Patent No. 2,713,335 granted July 19, 1955, and assigned to Bendix Aviation Corporation.

Further in order to add stability to the system the rate circuit as disclosed and claimed in the copending parent application Serial No. 561,083, now U. S. Patent No. 2,824,422, is provided in the circuit 400 for preventing acceleration or deceleration of the supercharger 300 in excess of a controlled limit.

In case of failure of the system or the main alternating current supply, a combined electromagnetic and mechanical clutch is provided between the automatic throttle actuator means and the throttle valve 3, so that when power is on, the electromagnetic clutch is connected to the automatic throttle actuator means. If the power is turned off, the clutch 2 shifts the connection of the throttle from the automatic throttle actuator means to a mechanical connection for manual operation by lever 1 through clutch 2. When the power is turned off, a suitable spring, not shown, may be provided which will open the waste gate 305, and the propeller pitch governor will remain at the setting in which it happened to be at the time that the power was turned off.

There is thus provided a novel electrical engine control system which does not require the usual long linkage connections between the pilot's cockpit and the engine nacelle. Also there is thus provided a plurality of inductively coupled controls, so arranged as to automatically adjust the various functions of the engine to values consistent with efficient and safe operation of the engine. Further there is provided compensation for external factors such as changes in atmospheric pressure for the power selected by the pilot whereby the several electrical actuators are energized to perform their functions within the range of engine performance.

Although only one embodiment of the invention has been illustrated and described, various changes in the form and relative arrangements of the parts may be made to suit requirements.

What is claimed is:

1. Control apparatus for use with an internal combustion engine having a combustion chamber, a compressor supplying air to the combustion chamber having a control device for regulating the compressing effect, a throttle for controlling the flow of air to the chamber and a variable loading device driven by the engine, comprising in combination, a first electric motor for positioning the throttle, a second electric motor for positioning the control device, current controlling means including a first electrical control element positioned by said first motor, a second electrical control element positioned by said second motor, a normally balanced electrical network associated with both of said motors for controlling the position thereof, means operatively connecting the first and second electrical control elements in the electrical network in such a manner as to cause said first and second electrical control elements to jointly control the position of the second motor and thereby the position of the control device for regulating the compressing effect of the compressor, means responsive to a pressure condition of the air supplied to said combustion chamber and operatively connected to said motors through said electrical network for automatically controlling both of said electric motors so as to maintain the pressure condition at a predetermined value, means for automatically controlling the effect of the loading device to maintain the engine speed at a predetermined value, movable inductive coupling means for adjusting said network and the means for controlling the loading device to vary said predetermined values, and a single manually operated control to position said movable inductive coupling means to simultaneously set the predetermined value of said pressure condition and adjust the control means to set the predetermined value of the engine speed.

2. Control apparatus for use with an internal combustion engine having a combustion chamber, a compressor supplying air to the combustion chamber having a control device for regulating the compressing effect, a throttle for controlling the flow of air to the chamber and a variable loading device driven by the engine, comprising in combination, a first electric motor for positioning the throttle, a second electric motor for positioning the control device, a balanceable electrical network associated with both of said motors for controlling the position thereof including two rebalancing inductive coupling members, one positioned by each of said motors, means operatively connecting the inductive coupling member positioned by said first motor in the balanceable electrical network in such a manner as to jointly control with the other rebalancing inductive coupling member the position of the second motor and thereby the position of the control device for regulating the compressing effect of the compressor, said network means also including means variable in accordance with a pressure condition of the air and being effective to operate said motors through said electrical network in such a manner as to maintain said pressure condition at a predetermined value, movable inductive coupling means for adjusting said network to vary said predetermined value, control means including said movable inductive coupling means for automatically controlling the variable loading device to maintain the engine speed at a predetermined value, and a single manually operated control to position said movable inductive coupling means to simultaneously set the predetermined value of said pressure condition and adjust the control means to set the predetermined value of the engine speed.

3. The combination defined by claim 2 in which there is provided an induction switch including means operative within a predetermined range of adjustment of the manually operated control to operatively connect to the first electric motor means the movable inductive coupling means and the rebalancing inductive coupling member positioned by said first electric motor so that the throttle may be positioned by said first electric motor proportional to the adjusted position of the manually operated control.

4. The combination defined by claim 3 in which the induction switch includes means operative within another predetermined range of adjustment of the manually operated control to operatively connect to the first electric motor means the movable inductive coupling means and the means variable with a pressure condition of the air to the combustion chamber so that the throttle may be positioned by said first electric motor upon variance in the pressure condition of the air from a value determined by the position of the movable inductive coupling means.

5. For use with an aircraft engine having an induction throttle valve, an engine speed governor, a turbo-supercharger driven by the exhaust gas from the engine, and a waste gate for controlling the speed of the turbo-supercharger; the combination comprising a plurality of amplifier circuits, a master transmitter, a pilot's control lever for controlling said master transmitter, each position of said lever being representative of a desired manifold pressure and a corresponding engine speed, a transformer for said engine speed governor, said transformer adapted to measure the position of the lever as a function of the master transmitter and apply voltage through one of said amplifier circuits, an actuator motor for controlling said governor and connected to the output of said one amplifier circuit, a governor cam adapted to correlate the governor's position with respect to the position of the master transmitter, manifold pressure responsive means, an engine pressure follow-up transformer adapted to measure the manifold pressure conditions of the engine, switch means to shift control of said throttle valve from said master transmitter to said pressure follow-up transformer, a polyphase actuator motor for controlling said throttle valve and connected in circuit with said switch means, said throttle valve actuator motor adapted to operate from said master transmitter when said switch means is in one position and from said pressure transformer when said switch means is in another position, said pressure actuated transformer being adapted to measure engine manifold pressures and to actuate the polyphase throttle valve actuator motor by applying its voltage output to the variable phase thereof through another of said first mentioned amplifier circuits to thereby open said throttle valve to a position for maintaining engine pressure equal to the pilot selected manifold pressure, a throttle valve position measuring transformer, a polyphase actuator motor for controlling said waste-gate and connected to the output of a third one of said amplifier circuits and arranged to function from the throttle valve measuring transformer, and a transformer arranged to be positioned by said waste-gate actuator motor, said last transformer connected to said waste-gate actuator motor to measure a predetermined correlated position of the waste-gate with respect to the position of the throttle valve transformer.

References Cited in the file of this patent
UNITED STATES PATENTS

| | | |
|---|---|---|
| 2,115,086 | Riggs | Apr. 26, 1938 |
| 2,217,364 | Halford et al. | Oct. 8, 1940 |
| 2,336,844 | Buck | Dec. 14, 1943 |
| 2,384,353 | Stieglitz | Sept. 4, 1945 |
| 2,540,916 | Sparrow | Feb. 6, 1951 |